United States Patent [19]
Pfeffer

[11] Patent Number: 5,342,424
[45] Date of Patent: Aug. 30, 1994

[54] METHOD OF FORMING COMPOSITE OF GLASS FIBERS OF VARIOUS FILAMENT DIAMETERS INTO A FIBROUS MAT

[76] Inventor: Jack R. Pfeffer, 4295 Country Club Dr., Bakersfield, Calif. 93306

[21] Appl. No.: 103,527

[22] Filed: Aug. 9, 1993

[51] Int. Cl.⁵ ............................................. C03B 37/06
[52] U.S. Cl. ............................. 65/450; 156/62.4; 210/289; 428/108; 428/218; 428/288
[58] Field of Search ............... 65/2, 4.4, 3.43, 3.44; 156/62.2, 62.4, 62.6; 428/108, 218, 288; 210/289

[56] References Cited

U.S. PATENT DOCUMENTS

| | | | |
|---|---|---|---|
| 2,728,699 | 12/1955 | Labino | 65/4.4 |
| 2,961,698 | 11/1960 | Rea | 65/4.4 |
| 3,262,578 | 7/1966 | Dennis | 210/289 |
| 4,201,247 | 5/1980 | Shannon | 65/4.4 |
| 4,463,048 | 7/1984 | Dickson et al. | 428/218 |

*Primary Examiner*—Robert L. Lindsay
*Attorney, Agent, or Firm*—William W. Haefliger

[57] ABSTRACT

A method of forming a fibrous composite that includes forming first and second layered groups of fibers extending in side-by-side relation; and passing gas such as air through the groups of fibers to effect controlled reduction in overall thickness of the two groups of fibers. The two groups of fibers are typically bonded together, and a think flexible, porous support layer may support the first layer which consists of glass fibers of smaller diameter than the glass fibers in the second layer.

17 Claims, 2 Drawing Sheets

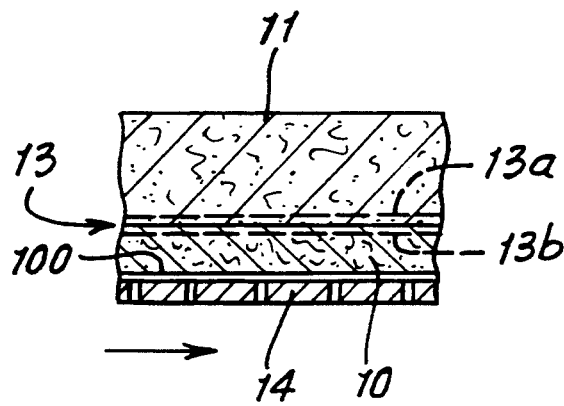
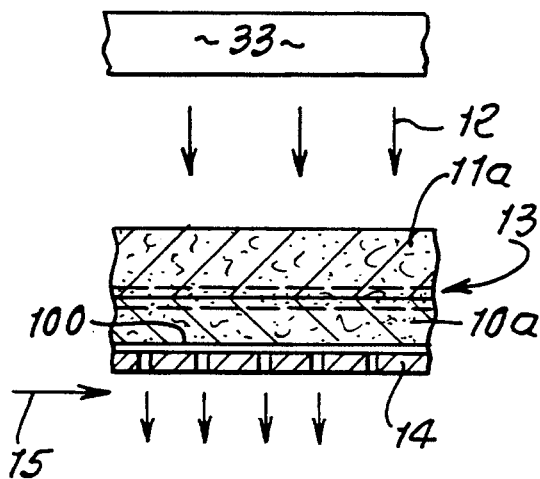
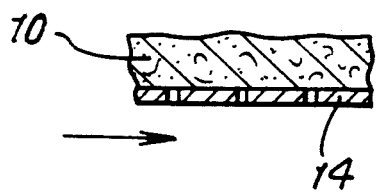
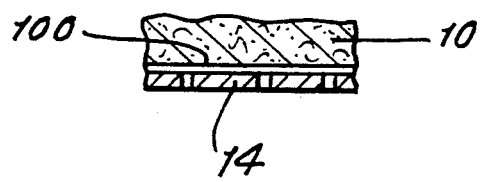
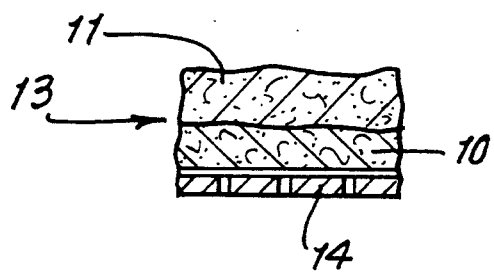
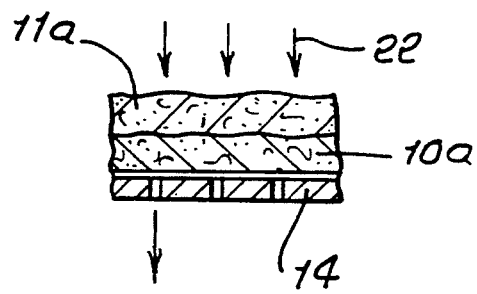

METHOD OF FORMING COMPOSITE OF GLASS FIBERS OF VARIOUS FILAMENT DIAMETERS INTO A FIBROUS MAT

BACKGROUND OF THE INVENTION

This invention relates generally to forming of glass fiber composites, as are used in high-efficiency air filtration; and more particularly the invention concerns a method of effecting controlled filtering capacity of two layers of fibers, of different sizes, by passage of air through the two layers, to control overall thickness.

There is need for longer-life filters capable of efficiently filtering particulate from gas streams, and there is need for efficient, effective methods of producing such filters. There is also need for preventing escape of smaller diameter glass fibers from a fibrous mat. The disclosure of U.S. Pat. No. 3,690,852, incorporated herein by reference, concerns production of a filter comprising two layers of fibers of different sizes. The present invention improves upon the methods described in that patent, as will be seen.

SUMMARY OF THE INVENTION

It is a major object of the invention to provide improved methods meeting the above need.

Basically, the method of the invention includes the steps:

a) forming first and second groups of fibers extending in layered side-by-side relation, b) and passing gas through the groups of fibers to effect controlled reduction in overall thickness of the two groups of fibers.

As will be seen, the fibers in the two groups have different diameters, and the two groups of fibers typically define a zone of intermingling and bonding together of the fibers in the two groups. Such bonding may be effected by coating fibers in the zone with synthetic resin, and curing the resin coating and the fibers in the zone, at least in part during passing of gas through the fibers, to control thickness of the two groups of fibers.

Another object is to provide fibers in the first group to have relatively smaller diameters, and fibers in the second group to have relatively larger diameters.

Yet another object is to effect gas (as for example air) passage through the two groups of fibers to cause the first group to have a density of about 0.25 to 0.45 lbs. per cubic foot, and to cause the second group likewise to have a density of about 0.25 to 0.45 lbs. per cubic foot. Such gas passage may be carried out to compress the composite into layers of predetermined thickness, which may be selectively controlled by control of the air flow. In this regard, one layer containing fibers of lesser diameter may be preformed to desired thickness, and the other layer containing fibers of greater diameter may be compressed by the air flow against the one layer to reduce overall thickness of the composite, and also to contain the fibers of lesser diameter against escape. The two layers are thereby also kept in better separated condition for better differentiation of filtering action.

A further object is to effect gas passage through the two groups of fibers to compress the groups into adjacent layers of predetermined thickness.

An added object is to control overall thickness of the two groups of fibers simultaneously, but one more than the other, or to reduce thickness of at least one of the two groups before the other.

An additional object is to support the two layers of fiber on a very thin, porous, flexible preformed layer of material, such as CEREX.

These and other objects and advantages of the invention, as well as the details of an illustrative embodiment, will be more fully understood from the following specification and drawings, in which:

DRAWING DESCRIPTION

FIG. 1a is a section taken through first and second groups of fibers extending in side-by-side relation;

FIG. 1b is a view like FIG. 1a but showing controlled gas flow through the fibers of the first and second groups, to control overall thickness reduction;

FIG. 2a is a section taken through a first group of fibers traveling on a support conveyor;

FIG. 2b is a view like FIG. 2a but also showing use of a thin support layer or sheet for the lower fiber group of layer;

FIG. 2c is a view like FIG. 1a showing a second group of fibers applied onto the compressed fibers of FIG. 2b; and FIG. 2d is a view like FIG. 1b showing the upper group of fibers being gas (air) pressure compressed;

DETAILED DESCRIPTION

Figure 3:
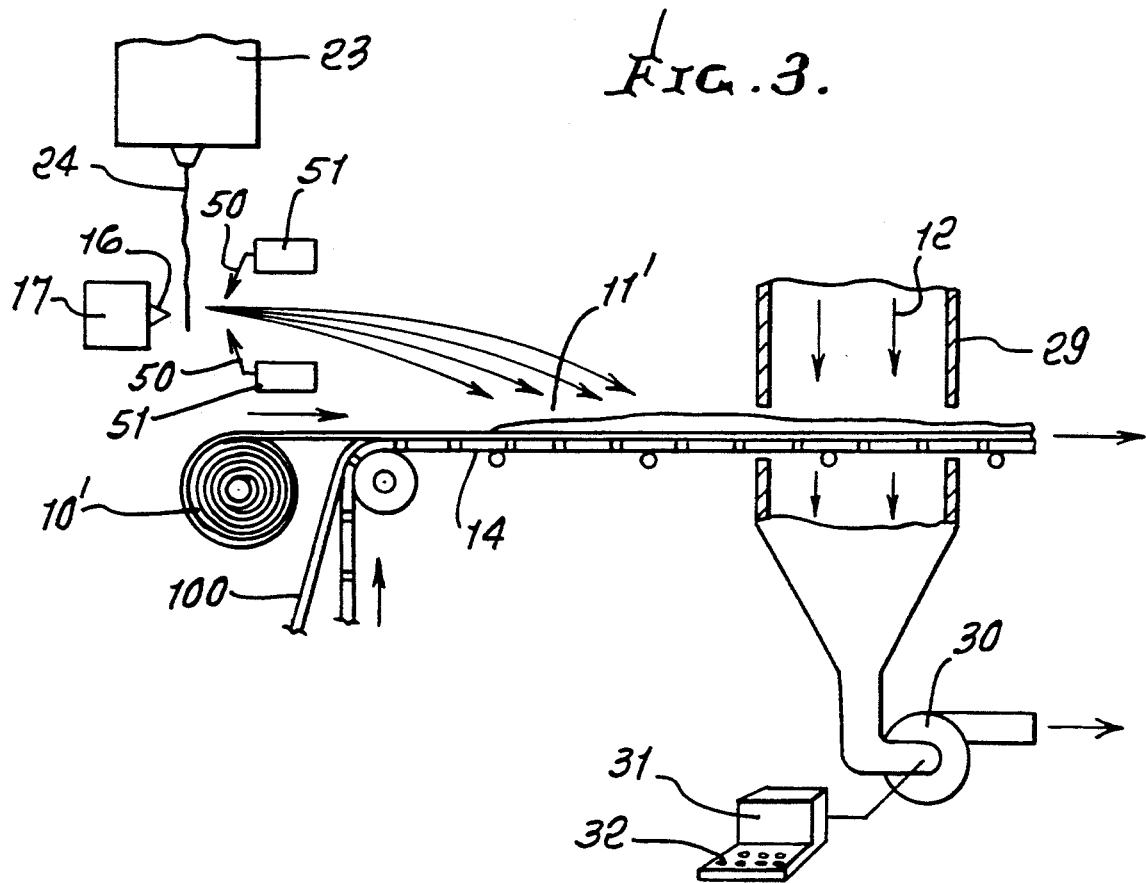
FIG. 3 is a view of apparatus to produce the two fiber group composite.

The method of forming the fibrous composite includes forming first and second layered or mat-like groups 10 and 11 of glass fibers extending in side-by-side relation, as in FIG. 1a; and passing gas through the groups of fibers to effect controlled reduction in overall thickness of the two groups of fibers, as for example to the resultant condition seen in FIG. 1b.

Arrows 12 indicate controlled flow of gas, such as air, through the groups or layers of fibers, to reduce group or layer 11 to the indicated reduced thickness form 11a. Layer 10 was typically preformed to the air pressure, compressed condition and thickness, as shown, the fibers therein bonded together by application of synthetic resin to the fibers as they are blown or formed, and laid down as layer 10a, the resin then curing. Layer 11 is then deposited on layer 10, as in FIG. 1a. The gas flow and pressure controlling source is seen at 33 in FIG. 1b. In this example, gas flows through both groups of fibers, simultaneously, and through a perforate conveyor 14 of Nylon cloth conveying the fiber groups rightwardly as indicated by arrow 15. In addition, preformed layer 10 may be laid down upon a thin, flexible layer 100 of porous material (as for example CEREX), acting as a flexible support for layer 10 and also containing (preventing escape of) very small diameter glass fibers in 10, which can tend to break. Layer 10 is not appreciably compressed by the air flow, since it was preformed. Layer 100 has a surface weight of between 0.4 and 0.5 oz. per square yard, its thickness being between 0.002 and 0.005 inch.

A boundary zone of intermingling of the fibers in the two groups 10 and 11 is indicated at 13, i.e., between the parallel broken lines 13a and 13b. Bonding of fibers in that zone is also effected, as by application of synthetic resin to fibers in that zone, and curing of such resin for coating the intermingled fibers in that zone. For that purpose, all of the fibers (which may consist of glass) may be coated with synthetic resin as the fibers are formed, as described in connection with FIG. 3 herein. The resin-coated fibers at the bottom of layer 10 bond to the thin support layer 100 if the latter is employed.

Typically, the relatively more fine fibers in the first group 10 have lesser diameters, as for example about 0.00004 inches; and the relatively more coarse fibers in the second group 11 have larger diameters, as for example about 0.0001 inches. Fibers in group 10 can range in diameter from 0.00002 to 0.00005 inch; and fibers in group 11 can range in diameter from 0.00006 to 0.00015 inch.

More importantly, gas passage through the two groups of fibers is effected to cause the density of the second group 11 of fibers to increase to about 0.25 to 0.45 lbs. per cubic foot. The first group 10 of fibers already has a density within that range as a result of having been preformed. Also, such gas passage through the two groups of fibers is carried out to compress the fiber groups into adjacent layers of predetermined thickness, according to the following:

|  | Initial Thickness | Final Thickness |
| --- | --- | --- |
| GROUP 10 | $t_1$ | $t_2$ (where $t_2 \approx t_1$) |
| GROUP 11 | $t_3$ (where $t_3 > t_1$) | $t_4$ (where $t_4 < t_3$ and $t_4 > t_2$) |

In the above, $t_2$ is typically 0.45 to 0.55 $t_4$.

Figure 4:
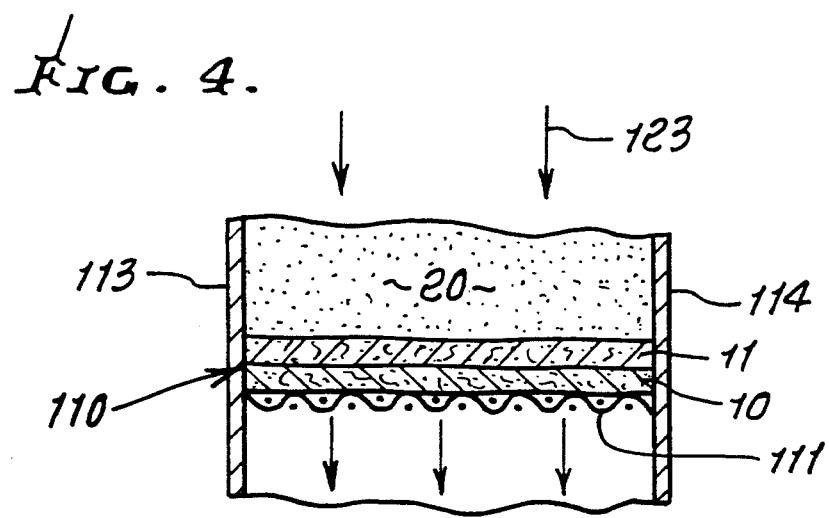
FIG. 4 is a section showing the resultant two fiber group composite in filter use mode.

Of further importance is the step of effecting the gas passage through the groups of fibers to compress the groups into adjacent layers wherein the first (fine fiber) and second (coarse fiber) layers have particle retention relative capacities of 95 and 85, respectively, when a particulate carrying gas stream is passed into the second layer and then into the first layer. See in this regard FIG. 4 showing a particulate conveying gas stream 20 passed first into the second filter layer 11, and then into and through the first layer 10, layer 11 having 85% particle retention capacity, and layer 10 having 95% particulate retention capacity, for the particular stream 20 being filtered.

In this regard, smaller voids are formed between fibers in layer 10 than in layer 11, whereby the largest particles are retained on filter layer 11, to prevent those particles from completely closing off the smaller voids between fibers in the layer 10. The larger surface area, together with the relatively larger openings provided by the coarser fibers in layer 11, enables a large amount of particulate material to be collected by layer 11 without "masking off" the filter, which would otherwise render the filters inoperative. In this regard, the sizing of the filter voids can be "tailored" to the particulate stream to be filtered by controlled compression of the two layers 11 and 10, by the air or gas stream 12. The latter also aids in curing the bonding material applied to the fibers, and the application of air can be continued until the layers 11 and 10 retain their desired thickness, as related to retention of particles in the stream to be filtered, due to curing of the resin tending to hold the fibers in controlled, compressed condition.

FIG. 2a shows only the preformed layer 10, as applied to the perforate conveyor 14; and FIG. 2b is like FIG. 2a but also shows alternative use of thin porous and protective support 100 beneath 10. Next, layer 11 is applied to compressed layer 10, as in FIG. 2c; and FIG. 2d shows controlled flow 22 of air (or other gas) through both layers to control overall thickness to selected or controlled extents, i.e., to forms 10a and 11a, where layer 11a is substantially reduced in thickness, and layer 10a has substantially the same thickness as layer 10. Precompression of layer 10 and compression of layer 11, as described, results in the relative differential 95% and 85% particle retention capacities referred to above.

FIG. 3 is a view partly similar to FIG. 2 in U.S. Pat. No. 3,690,852. A stream or streams 24 of molten glass are drawn downwardly from an orifice or orifices in a glass melt tank 23. Hot gas jets produced by burners 17 melt the fiber or fibers 24 to attenuate them into finer fibers displaced or blown rightwardly as shown, in group 11', to deposit on layer 10. Layer 10 is supplied off a roll 10' and onto the conveyor 14. Layer 10 was preformed in the same manner that layer 11 is formed from a stream of glass fibers 24. Resin is supplied at 50, as by spraying into the blown fibers, from source 51. Controlled air flows downwardly at 12, between channel walls 29, as produced by intake of a blower 30. The latter is motor driven at 31, and a keyboard control 32 selectively controls motor speed, to in turn control blower speed, and pressure and flow rate of air in stream 22. Thus, input to the keyboard determines the ultimate thicknesses of the two compressed layers 10 and 11 in the filter, and the filtering capability of the latter, as related to a particulate stream to be filtered.

The particulate-carrying stream may be initially sampled to determine average particle sizes, which the user can then relate to input at 32 to tailor the filter to the filtering task to be accomplished.

The ultimate composite glass fiber filter to be produced comprises:

a) first and second layers of glass fibers extending in adjacent parallel relation, b) synthetic resin coating the fibers of each layer and providing a bond holding the layers together in said parallel relation, c) the fibers of the first layer having smaller diameters than the fibers of the second layer, d) the fiber in both layers having densities between 0.25 and 0.45 lbs. per cubic foot.

FIG. 4 shows use of the filter 110 comprising layers 10 and 11, as referred to, supported as by a screen 111 in a duct or channel having walls 113 and 114. Particulate in the gas to be filtered is shown at 20, the glass flow direction indicated at 123.

Advantages of the method and resultant multi-layer filter media includes: high efficiency of operation in terms of dust or particle retention capacity; abuse-resistant media surface, i.e., the filter is more readily compatible with fabrication into filter apparatus; the upper layer 11 glass fibers are coarse enough that they won't be injected into the air stream being filtered, thereby mitigating health concerns; and retention of finer fibers in layer 10 "inside" the media package, i.e., sandwiched between layers 11 and 100, to block their escape.

I claim:

1. In the method of forming a fibrous composite, the steps that include a) forming first and second groups of glass fibers extending in layered side-by-side relation, one group formed by progressive build-up directly on top of the other, b) passing gas through said layered groups of fibers simultaneously to effect controlled reduction in overall thickness of the two groups of fibers, and to compress the groups into adjacent layers of controlled thickness, c) wherein the two groups of fibers define a zone of intermingling of fibers of the two groups, and including the step of effecting bonding of intermingling fibers in said zone, d) said bonding being effected by coating fibers in said zone with synthetic resin, and curing said resin coating and said fibers in said zone, at least in part during passing of gas through said fibers, e) said gas passage through said groups of fibers being effected to cause said first and second layers to have particle retention relative capacities of about 95 and 85 respectively when a particulate carrying gas stream is passed into said second layer and then into said first layer, f) and providing a porous, flexible, thin, support layer, and supporting said first and second groups of fibers on said support layer while gas is passed through both said groups and said support layer.

2. The method of claim 1 wherein said fibers in said first group have relatively smaller diameters, and the fibers in the second group have relatively larger diameters.

3. The method of claim 2 wherein said gas passes through the second group of fibers and then through the first group of fibers.

4. The method of claim 3 wherein said relatively lesser diameters are about 0.00004 inches.

5. The method of claim 1 including effecting said gas passage through the two groups of fibers to cause each group to have a density of about 0.25 to 0.45 lbs. per cubic foot.

6. The method of claim 1 wherein said first group of fibers is preformed as a mat to controlled thickness, and said second group of fibers is then deposited on said first group of fibers, before said gas flow through both said groups.

7. The method of claim 1 wherein said step b) is carried out to first reduce the thickness of the first group of fibers to form a first layer, and to next reduce the thickness of said second group of fibers subsequently applied over said first layer.

8. The method of claim 1 wherein gas is passed through said first group of fibers to form said first layer, and subsequently gas is passed through said second group of fibers and said first layer of fibers to reduce the thickness of said second group of fibers applied over said first layer.

9. The method of claim 8 wherein said gas is passed through said second group of fibers and said first layer of fibers at a rate and pressure to enhance intermingling of fibers of the second group with fibers of said first layer.

10. The method of claim 1 including initially forming the fibers of said two groups by thermal attenuation of glass fiber strands.

11. The method of claim 8 including effecting at least partial bonding of the two groups of fibers while gas is passing therethrough.

12. The method of claim 11 wherein said partial bonding is effected by preliminarily coating fiber with bonding agent, and partially curing said agent during gas passage through the fibers in said two groups.

13. The method of claim 1 including providing a porous, flexible, thin, support layer, and supporting said first and second groups of fibers on said support layer while gas is passed through both said groups and said layers.

14. The product produced by the method of claim 1.

15. The product produced by the method of claim 3.

16. In the method of forming a fibrous composite, the steps that include a) forming first and second groups of glass fibers extending in layered side-by-side relation, one group formed by progressive build-up directly on top of the other, b) passing gas through said layered groups of fibers simultaneously to effect controlled reduction in overall thickness of the two groups of fibers, and to compress the groups into adjacent layers of controlled thickness, c) wherein the two groups of fibers define a zone of intermingling of fibers of the two groups, and including the step of effecting bonding of intermingling fibers in said zone, d) said bonding being effected by coating fibers in said zone with synthetic resin, and curing said resin coating and said fibers in said zone, at least in part during passing of gas through said fibers, e) said gas passage through said groups of fibers being effected to cause said first and second layers to have particle retention differential relative capacities when a particulate carrying gas stream is passed into said second layer and then into said first layer, and whereby relatively larger particles are collected by said second layer and relatively smaller particles are collected by said first layer, f) and providing a porous, flexible, thin, support layer, and supporting said first and second groups of fibers on said support layer while gas is passed through both said groups and said support layer, whereby said support layer becomes connected to said first layer with said first layer located between said second layer and said support layer.

17. In the method of forming a fibrous composite, the steps that include a) forming first and second groups of glass fibers extending in layered side-by-side relation, one group formed by progressive build-up directly on top of the other, b) passing gas through said layered groups of fibers simultaneously to effect controlled reduction in overall thickness of the two groups of fibers, and to compress the groups into adjacent layers of controlled thickness, c) wherein the two groups of fibers define a zone of intermingling of fibers of the two groups, and including the step of effecting bonding of intermingling fibers in said zone, d) said bonding being effected by coating fibers in said zone with synthetic resin, and curing said resin coating and said fibers in said zone, at least in part during passing of gas through said fibers, e) said gas passing through said groups of fibers being effected to cause said first and second layers to have particle retention differential relative capacities when a particulate carrying gas stream is passed into said second layer and then into said first layer, and whereby relatively larger particles are collected by said second layer and relatively smaller particles are collected by said first layer, f) and supporting said first and second groups of fibers on a support layer while gas is passed through both said groups and said support layer.

* * * * *